2,922,697
CONDITIONED SODIUM CHLORIDE

Russell N. Bell, Clarendon Hills, and Lowell E. Netherton, Park Forest, Ill., assignors to Victor Chemical Works, a corporation of Illinois No Drawing. Original application August 20, 1954, Serial No. 451,302, now Patent No. 2,852,341, dated September 16, 1958. Divided and this application February 19, 1958, Serial No. 716,025

2 Claims. (Cl. 23—89)

This invention relates to conditioned sodium chloride having free-flowing, non-caking properties, which comprises sodium chloride and a water-insoluble calcium polyphosphate product.

F. Schwarz, Z. Inorg. Chem. 9:249–266 (1895) describes certain salts of polyphosphoric acids, including a calcium tripolyphosphate containing 42–44% water of hydration.

We have discovered that calcium polyphosphate has markedly different properties depending upon the manner in which it is produced and we have particularly discovered that it is possible to produce calcium phosphates having a ratio of $CaO/P_2O_5$ from 1.66 to 2 moles of the calcium oxide to each mole of the $P_2O_5$, in which the water of hydration is markedly less than the product found by Schwarz, which has a very low bulk density, and submicroscopic crystal size.

Strangely enough, very slight deviations in the method of preparing the material markedly change the crystal size and the bulk density, and these changes markedly and adversely affect the properties of the calcium phosphate.

The preferred material has approximately 8 molecules of water of hydration (compared to roughly 30 molecules of water of hydration in the Schwarz product). The present product may be dehydrated either to a tetrahydrate or to the anhydrous product without impairing its desirable properties.

The preferred product has a bulk density as low as 5 pounds per cubic foot. Its crystal size is submicroscopic and apparently well below 1 micron. A mass of the product will move under local pressure much like a liquid.

The product of this invention is remarkable in its conditioning and stabilizing qualities when mixed with various other salts. For example, small quantities of the calcium polyphosphate, when added to normaly hygroscopic table salt (i.e., sodium chloride) render it more resistant to moisture than other commonly used conditioners. It is also extremely valuable as a stabilizer when added to unstable hydrated salts such as dicalcium phosphate dihydrate.

The new product may be made by adding a 5–15% solution of sodium tripolyphosphate to a 2–10% solution of calcium chloride with constant agitation at a temperature of from approximately 50 to 100° C. The resulting slurry is then rapidly adjusted to a pH of approximately 9 with a small amount of lime and filtered immediately. It may be washed with hot water to reduce the residual chlorides and is then dried.

The reaction conditions are extremely critical. Thus if more concentrated solutions of the reactants are used, a mixed sodium calcium tripolyphosphate is formed. If lower temperatures are used, the product is composed of larger, more dense crystals which do not possess the unique stabilizing and conditioning ability. If the crystals are not filtered immediately, the stabilizing ability is lost. If even the order of addition is reversed, the resulting product does not possess this stabilizing ability.

The submicroscopic crystalline product produced is easily filtered to give an extremely light-weight filter cake. The product may be represented by the general formula $(CaO)_m(P_2O_5)_n \cdot xH_2O$, wherein the ratio $m/n$ may vary from approximately 1.66 to 2.00 and $x$ may vary from zero to approximately eight. In common analytical practice, the ratio of the weight of CaO to the weight of $P_2O_5$ is reported directly as analyzed. Thus, for the theoretical calcium tripolyphosphate $(CaO)_5(P_2O_5)_3$ the ratio of $m/n$ equals 1.66 whereas the analytical ratio $5CaO/3P_2O_5$ equals 0.66. The preferred ratio of $m/n$ from 1.66 to 2.00 thus corresponds to a range of analytical ratios from 0.66 to 0.79.

The preferred form of this new product appears to be primarily calcium tripolyphosphate octahydrate $$(CaO)_5(P_2O_5)_3 \cdot 8H_2O$$

The composition does not appear to be the critical factor, however, as products with ratios varying from approximately 1.66 to 2.00 have possessed satisfactory conditioning and stabilizing action when prepared according to the present invention. In contrast, material with an analysis and ratio exactly corresponding to the above formula, but prepared by a different method, does not possess this stabilizing action. Likewise material which corresponded to an octahydrate when dried at room temperature retained an excellent stabilizing action upon being successively dehydrated to the tetrahydrate at approximately 110° C. and to the anhydrous salt at approximately 420° C. Only at temperatures near 450° C. did this stabilizing action disappear.

The calcium chloride suitable for this process is the ordinary commercial product. It should be understood that any other soluble calcium salt may be used as a source of calcium ions, but that calcium chloride is the most economically feasible compound.

The sodium tripolyphosphate suitable for use is the ordinary commercial product and should analyze at least 90% sodium tripolyphosphate. Other sources of the triphosphate ion such as potassium tripolyphosphate will also produce the desired product, but are again impractical from an economic standpoint.

The following examples illustrate the preparation of the product:

EXAMPLE I 194 g. of sodium tripolyphosphate were dissolved in 2000 ml. water (9.7% soln.) and added to 153 g. calcium chloride dissolved in 3500 ml. water (4.7% soln. and 5% excess over sodium tripolyphosphate) at 70 to 75° C. The addition took one hour after which the solution was neutralized to a pH of 7–8 by adding 7–8 g. of dry hydrated lime and immediately filtered. The resulting filter cake was washed with 2000 ml. water at room temperature. The cake was then air dried at room temperature. The product analyzed as follows: CaO=33.8%, $P_2O_5$=46.2%, ratio $CaO/P_2O_5$=.73, loss on ignition=19.1%. The pH of a 1% solution of the product was 7.0.

EXAMPLE II

In a similar manner, 37 g. of sodium tripolyphosphate were dissolved in 400 ml. water (8.5% soln.) and rapidly added to a solution of 28 g. $CaCl_2$ in 700 ml. of water (3.8% soln.) at 75 to 80° C. with vigorous agitation. The resulting crystals were filtered, washed with approximately a liter of cold water, and dried at 105° C.

*Analysis.*—CaO=35.1%, $P_2O_5$=53.2%, ratio=0.66, loss=9.7%.

EXAMPLE III

A series of similar charges were made in which a hot, dilute solution of sodium tripolyphosphate was added to a hot, dilute solution of calcium chloride with vigorous agitation. The pH was adjusted by adding calcium hydroxide. The following table of data sets forth the pertinent information obtained.

Table I

| Charge No. | Solution Strength | | Add'n Temp. | Final pH | CaO P₂O₅ | Loss on Ignition |
|---|---|---|---|---|---|---|
| | $Na_5P_3O_{10}$ | $CaCl_2$ | | | | |
| 1 | 7.6 | 3.8 | 80 | 7.3 | 0.65 | 15.3 |
| 2 | 7.6 | 3.8 | 80 | 9.6 | 0.80 | 14.8 |
| 3 | 13.6 | 4.0 | 60 | 10.2 | 0.64 | 13.8 |
| 4 | 13.6 | 6.9 | 75 | 9.0 | 0.69 | 15.5 |
| 5 | 6.8 | 6.9 | 60 | 9.9 | 0.75 | 15.0 |

All of these products were found to possess excellent stabilizing and conditioning qualities. The products were extremely light weight, a representative sample having a bulk density of only 5 lb./ft.³

EXAMPLE IV

In a similar manner a 9.1% solution of potassium tripolyphosphate was added to a 5% solution of calcium chloride at 70–75° C. The product had good stabilizing characteristics.

X-ray tests on all of these products showed crystalline characteristics of a single compound. The differences in the ratio of calcium oxide to $P_2O_5$ is not thoroughly understood since the X-ray indicates the presence of one dominant compound in all cases. It may be that the deviations represent the presence of some unreacted calcium oxide as an impurity.

The critical nature of the order of addition is indicated by the following tests:

EXAMPLE V

A 15% solution of calcium chloride was added to a 4.5% solution of sodium tripolyphosphate with constant agitation at 80° C. The product had a CaO/$P_2O_5$ ratio of 0.62, but the product was of a comparatively coarse dense nature. Similar attempts at reversing the order of addition using various concentrations of solutions running from 4.0 to 15.0% for the calcium chloride, and from 4.5 to 13.6% for the tripolyphosphate failed to produce a satisfactory product. The material was always of a more dense nature and did not possess stabilizing and conditioning characteristics. A representative sample of this material had a bulk density of 18.7 lbs./ft.³

The excellent conditioning action of the compound of the present invention may be illustrated by its action when mixed with common table salt. It is well known that such salt is somewhat hygroscopic and easily caked in its normal state. One means for evaluating its resistance to moisture is to slowly drop water into a known quantity of salt until it will no longer freely flow through a glass laboratory funnel. The following test shows a comparison between calcium polyphosphate prepared as in Example III and tricalcium phosphate which is well known for its ability to render salt resistant to moisture.

EXAMPLE VI

Two 100-gram portions of untreated common table salt which had been thoroughly dried were mixed with 2-gram portions of calcium polyphosphate and tricalcium phosphate, respectively. Water was then added dropwise until each mixture caked sufficiently to prevent its flowing through a glass funnel. The sample which was conditioned with calcium polyphosphate absorbed 44 drops of water. The sample conditioned with an equivalent amount of the customary tricalcium phosphate absorbed only 23 drops which indicates that it is only about one half as effective as a salt conditioner.

A test of the ability of this new material to exert a stabilizing action on other finely divided materials is demonstrated with dicalcium phosphate dihydrate. This material is well known as being very susceptible to damage from caking due to dehydration. Dicalcium phosphate dihydrate will lose water and convert to the anhydrous form even when stored at a relative humidity of 75% at a temperature of 60° C. It is during this change in the degree of hydration that caking occurs. Therefore, the resulting degree of hydration expressed in terms of percent anhydrous material serves as a convenient index for comparing the stability to caking of different lots of material.

It has been found that addition of calcium polyphosphate to dicalcium phosphate dihydrate, either during manufacture or by simply mixing with the finished product, greatly increases the stability of this compound. The following data compare untreated dicalcium phosphate dihydrate with variously treated material after storage for 48 hours at 60° C. and 75% relative humidity.

EXAMPLE VII

| Sample | Percent decomposed to anhydrous form |
|---|---|
| Regular material | 97.5% decomposed. |
| 1% calcium polyphosphate added after mfg | 37% decomposed. |
| 2% calcium polyphosphate added after mfg | 22% decomposed. |
| 3% calcium polyphosphate added after mfg | 15.5% decomposed. |
| 4% calcium polyphosphate added after mfg | 6.5% decomposed. |
| 2½% calcium polyphosphate added during mfg | 3.0% decomposed. |

The crystals of the present product tend to form loosely-held aggregates or flocs when tested by the method of W. O. Hinckley, vol. 14, page 10 (1942), described in Industrial and Engineering Chemistry.

A typical compound had the following particle size analysis:

| | Percent |
|---|---|
| 0–2.5 microns diameter | 6.0 |
| 2.5–5 microns diameter | 83.1 |
| 5–10 microns diameter | 6.8 |
| 10–20 microns diameter | 4.0 |
| 20 microns diameter | Nil |

This application is a division of our allowed, copending application entitled "Calcium Polyphosphate and Method of Producing the Same," Serial No. 451,302, filed August 20, 1954, which issued as Patent 2,852,341.

The foregoing detailed description has been given for clearness of understanding only and no unnecessary limitations should be understood therefrom as modifications will be obvious to those skilled in the art.

We claim:

1. Conditioned sodium chloride having free-flowing, non-caking properties, which comprises sodium chloride and a minor proportion of a water-insoluble calcium polyphosphate having submicroscopic crystals of less than one micron size and the property of conditioning sodium chloride, said calcium polyphosphate produced by the process which comprises adding a 5 to 15% solution of an alkali metal tripolyphosphate to a 2 to 10% solution of a soluble calcium salt at a temperature between 50° and 100° C., rapidly adjusting the pH of the resulting slurry to approximately 7–10, immediately removing the resulting crystals of calcium polyphosphate from the reaction mixture, and drying the same.

2. Conditioned sodium chloride having free-flowing, non-caking properties, which comprises sodium chloride and about 0.1% to about 5% of a water-insoluble calcium polyphosphate having submicroscopic crystals of less than one micron size and the property of conditioning sodium chloride, said calcium polyphosphate produced by the process which comprises adding a 5 to 15% solution of an alkali metal tripolyphosphate to a 2 to 10% solution of a soluble calcium salt at a temperature between 50° and 100° C., rapidly adjusting the pH of the resulting slurry to approximately 7–10, immediately removing the resulting crystals of calcium polyphosphate from the reaction mixture, and drying the same.

References Cited in the file of this patent
UNITED STATES PATENTS

| | | |
|---|---|---|
| Re. 18,907 | Warning et al. | Aug. 1, 1933 |
| 352,465 | Hughes | Nov. 9, 1886 |

OTHER REFERENCES

Moss et al.: "Tricalcium Phosphate as a Caking Inhibitor," published in Industrial and Engineering Chemistry, vol. 25, No. 2 (February 1933), pp 142–146.